United States Patent
Miklós et al.

(10) Patent No.: US 12,225,530 B2
(45) Date of Patent: Feb. 11, 2025

(54) CORE NETWORK INDICATION OF RADIO ACCESS NETWORK ACTION WHEN REDUNDANCY IS NOT AVAILABLE

(71) Applicant: Telefonaktiebolaget LM Ericsson (publ), Stockholm (SE)

(72) Inventors: György Miklós, Pilisborosjenő (HU); Nianshan Shi, Järfälla (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 466 days.

(21) Appl. No.: 17/619,106

(22) PCT Filed: Jun. 17, 2020

(86) PCT No.: PCT/IB2020/055662
§ 371 (c)(1),
(2) Date: Dec. 14, 2021

(87) PCT Pub. No.: WO2020/254987
PCT Pub. Date: Dec. 24, 2020

(65) Prior Publication Data
US 2022/0272735 A1    Aug. 25, 2022

Related U.S. Application Data

(60) Provisional application No. 62/862,489, filed on Jun. 17, 2019.

(51) Int. Cl.
*H04W 72/20* (2023.01)
*H04L 5/00* (2006.01)

(52) U.S. Cl.
CPC ........... *H04W 72/20* (2023.01); *H04L 5/0055* (2013.01)

(58) Field of Classification Search
CPC ..... H04W 72/20; H04W 72/00; H04W 92/12; H04W 72/53; H04L 5/0055; H04L 65/1016; H04M 15/66
See application file for complete search history.

(56) References Cited

U.S. PATENT DOCUMENTS

| | | | |
|---|---|---|---|
| 2012/0314700 A1* | 12/2012 | Ku | H04L 65/1016 370/352 |
| 2019/0109721 A1* | 4/2019 | Qiao | H04M 15/66 |
| 2019/0239280 A1* | 8/2019 | Li | H04W 72/53 |

FOREIGN PATENT DOCUMENTS

| CN | 101808365 A | 8/2010 |
|---|---|---|
| CN | 101827394 A | 9/2010 |

(Continued)

OTHER PUBLICATIONS

Author Unknown, "Technical Specification Group Services and System Aspects; System Architecture for the 5G System; Stage 2 (Release 16)," Technical Specification 23.501, Version 16.0.2, Apr. 2019, 3GPP Organizational Partners, 317 pages.

(Continued)

*Primary Examiner* — Kiet Tang
(74) *Attorney, Agent, or Firm* — Sage Patent Group

(57) ABSTRACT

Systems and methods are disclosed herein that relate to actions performed by a Radio Access Network (RAN) when redundancy is not available. In this regard, embodiments of a method performed by a RAN node are disclosed. In one embodiment, a method performed by a RAN node for RAN action when redundancy is not available comprises receiving, from a core network node, a request for a set of User Plane (UP) resources in the RAN. The method further comprises determining whether the request for the set of UP resources in the RAN can be met and sending, to the core network node, a response to the request for the set of UP (Continued)

resources that is based on whether the request for the set of UP resources in the RAN can be met.

20 Claims, 10 Drawing Sheets

(56) References Cited

FOREIGN PATENT DOCUMENTS

| CN | 102348212 | A  | 2/2012 |
|----|-----------|----|--------|
| CN | 103731839 | A  | 4/2014 |
| WO | 2017137075 | A1 | 8/2017 |
| WO | 2019130048 | A1 | 7/2019 |
| WO | 2020074091 | A1 | 4/2020 |

OTHER PUBLICATIONS

Author Unknown, "Technical Specification Group Radio Access Network; Evolved Universal Terrestrial Radio Acces (E-UTRA) and Evolved Universal Terrestrial Radio Access Network (E-UTRAN); Overall description; Stage 2 (Release 15)," Technical Specification 36.300, Version 15.5.0, Mar. 2019, 3GPP Organizational Partners, 363 pages.

Author Unknown, "Technical Specification Group Radio Acces Network; Evolved Universal Terrestrial Radio Access (E-UTRA) and NR; Multi-connectivity; Stage 2 (Release 15)," Technical Specification 37.340, Version 15.5.0, Mar. 2019, 3GPP Organizational Partners, 68 pages.

Author Unknown, "Technical Specification Group Radio Access Network; NR; NR and NG-RAN Overall Description; Stage 2 (Release 15)," Technical Specification 38.300, Version 15.5.0, Mar. 2019, 3GPP Organizational Partners, 98 pages.

Ericsson, "S2-190xxxx: Failure handling for redundancy based on dual connectivity," 23.501 Change Request, 3GPP TSG-SA WG2 Meeting #134, Sapporo, Japan, Jun. 24-28, 2019, 4 pages.

Ericsson, "S2-190xxxx: Failure handling for redundancy based on dual connectivity," 23.502 Change Request, 3GPP TSG-SA WG2 Meeting #134, Sapporo, Japan, Jun. 24-28, 2019, 25 pages.

International Search Report and Written Opinion for International Patent Application No. PCT/IB2020/055662, mailed Aug. 20, 2020, 17 pages.

\* cited by examiner

CORE NETWORK INDICATION OF RADIO ACCESS NETWORK ACTION WHEN REDUNDANCY IS NOT AVAILABLE

RELATED APPLICATIONS

This application is a 35 U.S.C. § 371 national phase filing of International Application No. PCT/IB2020/055662, filed Jun. 17, 2020, which claims the benefit of provisional patent application Ser. No. 62/862,489, filed Jun. 17, 2019, the disclosures of which are hereby incorporated herein by reference in their entireties.

TECHNICAL FIELD

The present disclosure relates to a cellular communications system and, in particular, to redundancy in a Radio Access Network (RAN) of a cellular communications system.

BACKGROUND

The Fifth Generation (5G) of mobile technology is positioned to provide a much wider range of services than the existing Third Generation (3G)/Fourth Generation (4G) technologies. It is expected to enable a fully connected society in which a rich set of use cases—some of them are still not yet conceptualized—will be supported from enhanced Mobile Broadband (eMBB) through media distribution and Massive Machine Type Communication (M-MTC) to mission critical services (e.g., Critical Machine Type Communication (C-MTC)).

The C-MTC use case group covers a large set of applications, but most of them can be characterized by low latency and high reliability, as well as high availability. It should be mentioned that although low latency is an important criterion in numerous use cases, high reliability is expected to be a basic requirement in a much wider range of services. For example, low latency and high reliability are very important factors in industry (factory) automation use cases (e.g., high speed motion control, packaging, printing, etc.) and several special subtasks of the "smart grid" service. In the above use cases, the guarantees on latency and reliability requirements together provide sufficient service quality. High reliability is also important in such use cases where there are relaxed requirements on latency (e.g., higher delay and/or higher jitter can be tolerated). Illustrative examples could be Intelligent Traffic Systems (ITS), remote controlling (with or without haptic feedback), robotized manufacturing, smart grid, Automated Guided Vehicles (AGVs), drone controlling, tele-surgery, etc. In these use cases, extremely low latency is not the crucial factor, but the high (and in some cases, the extremely high) reliability of the connectivity between the application server and the C-MTC device is the most important requirement. To summarize, it can be said that reliability is a very important requirement for use cases with low latency requirements, but the reliability in itself could be the basic characteristic of C-MTC services.

The Time-Sensitive Networking (TSN) task group of Institute of Electrical and Electronic Engineers (IEEE) 802.1 provides a standardized solution to satisfy low latency and high reliability requirements in fixed Ethernet networks. The Internet Engineering Task Force (IETF) Deterministic Networking (DetNet) activity extends the solution to layer 3 networks.

FIG. 1 illustrates the reliability solution provided by TSN/DetNet. A replication entity N1 creates a replica of each Ethernet frame/Internet Protocol (IP) packet and assigns a sequence number to the frame/packet. An elimination entity N2 uses the sequence number to find duplicates of the same frame/packet so that only a single copy of a given frame/packet is forwarded onwards. The Frame Replication and Elimination for Reliability (FRER) function/ Packet Replication and Elimination Function (PREF) may be applied between intermediate switches, or between the end devices themselves. The paths taken by the replicated frames/packets are configured to be disjoint so that a fault on one path does not affect the other path.

There is a demand for a similar type of reliability approach for 5G or even 4G/Long Term Evolution (LTE) networks. One approach is shown in FIG. 2. FIG. 2 illustrates a conventional reliability approach based on the Dual Connectivity (DC) feature of 5G or 4G/LTE. DC allows a single User Equipment (UE) that is suitably equipped with two transceivers to have User Plane (UP) connectivity with two base stations, such as two New Radio (NR) Base Stations (gNBs) shown as a Master gNB (MgNB) and a Secondary gNB (SgNB), while the UE is connected to only a single base station (e.g., MgNB) in the Control Plane (CP). Third Generation Partnership Project (3GPP) Technical Specifications (TSs) 36.300 (see, e.g., V15.5.0), TS 38.300 (see, e.g. V15.5.0), and TS 37.340 (see, e.g., V15.5.0) include more details on DC in 4G/LTE and 5G.

The use of DC for redundant data transmission is described in 3GPP TS 23.501 (see, e.g., V15.5.0) section 5.33.2.1. In that case, the UE establishes two Protocol Data Unit (PDU) sessions, such that the Core Network (CN) selects separate User Plane Function (UPF) entities, and the CN also requests the Radio Access Network (RAN) to establish DC.

As described in 3GPP TS 23.501 section 5.33.2.1, the CN uses the Redundancy Sequence Number (RSN) parameter to request the use of DC for redundancy. At the establishment of the PDU sessions or at transitions to the CM-CONNECTED state, the RSN parameter indicates to a Next Generation RAN (NG-RAN) that redundant UP resources are to be provided for the given PDU sessions by means of DC. The value of the RSN parameter indicates redundant UP requirements for the PDU sessions. This request for redundant handling is made by indicating the RSN to the RAN node on a per PDU session granularity. PDU sessions associated with different RSN values are realized by different, redundant UP resources. Based on the RSN and the RAN configuration, the NG-RAN sets up DC as defined in TS 37.340 so that the sessions have end-to-end redundant paths. When there are multiple PDU sessions with the RSN parameter set and with different values of RSN, this indicates to the NG-RAN that the CN is requesting DC to be set up and the UP is to be handled as indicated by the RSN parameter and the associated RAN configuration.

FIG. 3 illustrates another conventional reliability approach, which is to equip the terminal device with multiple physical UEs. It is then possible to set up disjoint paths with disjoint PDU sessions from these UEs. The solution described in 3GPP TS 23.501 Annex F presents a way to select different RAN entities for the UEs based on a static grouping. The solution is illustrated in FIG. 3, where the terminal device is equipped with separate UEs, UE1 and UE2, and the network provides redundant coverage with RAN entities gNB1 and gNB2 that are preferably selected such that UE1 connects to gNB1 and UE2 connects to gNB2.

The 3GPP approaches above provide a solution for setting up disjoint paths over the 3GPP network. These disjoint paths can be used in different ways, e.g. FRER/PREF can make use of the disjoint paths by sending replicated frames/packets over them; but it could also be possible to use only one path as an active path and use the other path as a backup path. From the terminal device's perspective, the two paths appear as two logical interfaces.

Note also that redundant handling may apply to only a subset of the data flows. It may be possible that there are other PDU sessions which are not subject to redundant handling. It may also be possible that the PDU sessions with redundant handling also carry other traffic flows which are not subject to redundant handling, i.e. not replicated or otherwise protected by an end to end redundancy mechanism.

Even though the disjoint UP paths can be established using the solutions above, the disjoint path establishment in a RAN is inherently opportunistic. Whether or not the redundant paths are possible is subject to a number of factors, such as the availability of redundant RAN coverage, the current radio link quality over both paths, radio resource limitations based on the instantaneous traffic conditions and user mobility patterns, and node resource constraints. Due to these unpredictable factors, it may happen that disjoint paths are momentarily not possible, and both UP paths traverse the same UP resources. Redundancy may still apply over the air interface and at other parts of the network. Such uncertainties are not present in fixed networks.

The current description of the DC based redundancy solution in TS 23.501 section 5.33.2.1 discusses failure handling. It is described that the NG-RAN notifies the CN about failure to establish DC, and that the Session Management Function (SMF) in the CN decides, based on local policy, whether to continue with the PDU session or initiate release of the PDU session. Depending on the deployment and requirements, it may make sense to keep both paths even if they are not disjoint in RAN, as the disjoint paths may still provide redundancy in the rest of the network (possibly outside the 3GPP network as well).

A prior solution collects information about whether or not redundancy is currently available in RAN. Based on the information, a network management system or a network operator may decide on further actions, e.g. the communication may be stopped, or the disjoint UP paths can be disabled, or statistical data may be collected based on which the network may be extended or upgraded. The prior solution detects whether RAN redundancy is set up or not. The prior solution consists of a detection entity in RAN which checks whether redundancy is set up or not, and a notification mechanism where changes in the redundancy setup are notified towards the core network for the devices where a network function has subscribed to such notifications.

There currently exist certain challenge(s). The situation where RAN cannot provide the requested UP resources is not sufficiently handled. In the conventional redundancy solution based on DC in 3GPP TS 23.501 section 5.33.2.1, the RAN can indicate to the CN during the establishment of the PDU session that redundancy in RAN cannot be provided as requested. However, this indication only takes place during the session establishment phase. The RAN status could change over time, and current standards do not describe how to handle events that occur after the session establishment phase.

A prior solution addresses that problem by adding a notification mechanism from the RAN to the CN, which can continuously update the CN about the RAN status. However, such a notification mechanism introduces a significant complexity in both the RAN and the CN, as well as a signaling load which adds to the signaling burden of the system.

SUMMARY

Systems and methods are disclosed herein that relate to actions performed by a Radio Access Network (RAN) when redundancy is not available. In this regard, embodiments of a method performed by a RAN node are disclosed. In one embodiment, a method performed by a RAN node for RAN action when redundancy is not available comprises receiving, from a core network node, a request for a set of User Plane (UP) resources in the RAN. The method further comprises determining whether the request for the set of UP resources in the RAN can be met and sending, to the core network node, a response to the request for the set of UP resources that is based on whether the request for the set of UP resources in the RAN can be met.

In one embodiment, the request comprises an indication that the requested set of UP resources is required or preferred, and the response to the request for the set of UP resources is further based on the indication that the requested set of UP resources is required or preferred. In one embodiment, the method further comprises establishing or refraining from establishing the requested set of UP resources based on whether the request for the set of UP resources in the RAN can be met and the indication that the requested set of UP resources is required or preferred. The indication helps determine the appropriate RAN action not only initially, but later on as well. This is useful as the RAN redundancy status may change over time, e.g. Dual Connectivity (DC) status may change. The indication helps reduce system complexity, as a more complex notification mechanism to the core network can be avoided. The solution provides flexibility as well as robustness for the different network deployments.

In one embodiment, the indication is an indication that the requested set of UP resources is required, determining whether the request for the set of UP resources in the RAN can be met comprises determining that the request for the set of UP resources in the RAN cannot be met, and the response provides a negative acknowledgement. In one embodiment, the method further comprises refraining from establishing the requested set of UP resources based on the indication that the requested set of UP resources is required and determining that the request for the set of UP resources in the RAN cannot be met.

In one embodiment, the indication is an indication that the requested set of UP resources is required, determining whether the request for the set of UP resources in the RAN can be met comprises determining that the request for the set of UP resources in the RAN can be met, and the response comprises a positive acknowledgement. In one embodiment, the method further comprises establishing the set of UP resources based on the indication that the requested set of UP resources is required and determining that the request for the set of UP resources in the RAN can be met.

In one embodiment, the indication is an indication that the requested set of UP resources is required, determining whether the request for the set of UP resources in the RAN can be met comprises determining that the RAN node cannot yet determine whether the request for the set of UP resources in the RAN can be met, and the response comprises a positive acknowledgement. In one embodiment, the method further comprises establishing UP resources based on the indication that the requested set of UP resources is required and determining that the RAN node cannot yet determine whether the request for the set of UP resources in the RAN can be met, the established resources comprising UP resources that are not the requested set of UP resources.

In one embodiment, the indication is an indication that the requested set of UP resources is preferred, determining whether the request for the set of UP resources in the RAN can be met comprises determining that the request for the set of UP resources in the RAN cannot be met, and the response comprises information that indicates that the requested set of UP resources could not be provided. In one embodiment, the response comprises information that identifies actual UP resources that were allocated and are different than the set of UP resources requested.

In one embodiment, the indication is an indication that the requested set of UP resources is preferred, determining whether the request for the set of UP resources in the RAN can be met comprises determining that the RAN node is unable to determine whether the request for the set of UP resources in the RAN can be met, and the response provides a positive acknowledgement.

In one embodiment, the request identifies a Protocol Data Unit (PDU) session, the set of UP resources is a set of UP resources for the PDU session, and the indication that the requested set of UP resources is required or preferred is provided for the PDU session on a per-PDU-session granularity. In one embodiment, the request further comprises a Redundancy Sequence Number (RSN) that indicates whether the PDU session is one of two or more redundant PDU sessions.

In one embodiment, the RAN comprises a Fifth Generation (5G) RAN or a Long Term Evolution (LTE) RAN.

In one embodiment, the request further comprises an indication of whether to keep or release allocated UP resources when the request cannot be met for a given period of time. In one embodiment, the given period of time to keep the allocated UP resources when the request cannot be met is different from the given period of time to release the allocated UP resources when the request cannot be met.

In one embodiment, the request further comprises an indication to establish the requested set of UP resources only if the requested set of UP resources can be established within a given period of time.

In one embodiment, the request further comprises an indication that the decision to keep or release a UP session depends upon the presence, absence, or status of another, different UP session.

In one embodiment, the request further identifies a period or interval during or at which the RAN should check availability or unavailability of the requested set of UP resources.

Corresponding embodiments of a RAN node are also disclosed. In one embodiment, a RAN node for RAN action when redundancy is not available is adapted to receive, from a core network node, a request for a set of UP resources in the RAN, determine whether the request for the set of UP resources in the RAN can be met, and send, to the core network node, a response to the request for the set of UP resources that is based on the indication that the requested set of UP resources is required or preferred and whether the request for the set of UP resources in the RAN can be met.

In one embodiment, a RAN node for RAN action when redundancy is not available comprises processing circuitry configured to cause the RAN node to receive, from a core network node, a request for a set of UP resources in the RAN, determine whether the request for the set of UP resources in the RAN can be met, and send, to the core network node, a response to the request for the set of UP resources that is based on the indication that the requested set of UP resources is required or preferred and whether the request for the set of UP resources in the RAN can be met.

Embodiments of a method performed by a network node in a core network of a cellular communications system are also disclosed. In one embodiment, a method performed by a network node in a core network of a cellular communications system for indication of a RAN action when redundancy is not available comprises sending, to a RAN node, a request for a set of UP resources in the RAN, the request comprising an indication that the requested set of UP resources is required or preferred. The method further comprises receiving, from the RAN node, a response to the request for UP resources.

In one embodiment, the request identifies a PDU session, the set of UP resources is a set of UP resources for the PDU session, and the indication that the requested set of UP resources is required or preferred is provided for the PDU session on a per-PDU-session granularity. In one embodiment, the request further comprises a RSN that indicates whether the PDU session is one of two or more redundant PDU sessions.

In one embodiment, the indication is an indication that the requested set of UP resources is required. In one embodiment, the indication that the requested set of UP resources is required indicates that the PDU session should not be created if the requested set of UP resources is not available. In one embodiment, the indication that the requested set of UP resources is required indicates that the PDU session should be created if the requested set of UP resources is available but released if the UP resources subsequently become unavailable.

In one embodiment, the indication is an indication that the UP resources are preferred. In one embodiment, the indication that the UP resources are preferred indicates that the PDU session should be created even if the requested set of UP resources is not available. In one embodiment, the indication that the UP resources are preferred indicates that the PDU session should use the requested set of UP resources if the requested set of UP resources subsequently become unavailable.

In one embodiment, the response comprises an acknowledgement that indicates a success or a negative acknowledgement that indicates a failure.

In one embodiment, the request further comprises an indication of whether to keep or release the set of UP resources when the request cannot be met for a given period of time. In one embodiment, the given period of time to keep the set of UP resources when the request cannot be met is different from the given period of time to release the set of UP resources when the request cannot be met.

In one embodiment, the request further comprises an indication to establish the requested set of UP resources only if the requested set of UP resources can be established within a given period of time.

In one embodiment, the request further comprises an indication that the decision to keep or release an UP session depends upon the presence, absence, or status of another, different UP session.

In one embodiment, the request further identifies a period or interval during or at which the RAN node should check availability or unavailability of the requested set of UP resources.

In one embodiment, the network node is an Access and Mobility Management Function (AMF).

Corresponding embodiments of a network node are also disclosed. In one embodiment, a network node in a core network of a cellular communications system for indication of a RAN action when redundancy is not available is adapted to send, to a RAN node, a request for a set of UP resources in the RAN, the request comprising an indication that the requested set of UP resources is required or preferred. The network node is further adapted to receive, from the RAN node, a response to the request for UP resources.

In one embodiment, a network node in a core network of a cellular communications system for indication of a RAN action when redundancy is not available comprises processing circuitry configured to cause the network node to send, to a RAN node, a request for a set of UP resources in the RAN, the request comprising an indication that the requested set of UP resources is required or preferred. The processing circuitry is further configured to cause the network node to receive, from the RAN node, a response to the request for UP resources.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
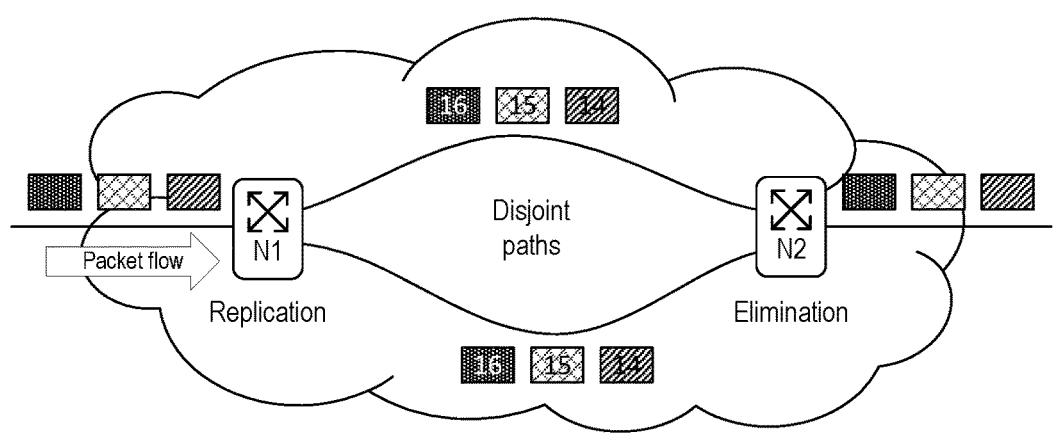
FIG. 1 illustrates the reliability solution provided by Time Sensitive Networking (TSN)/Deterministic Networking (DetNet)
Figure 2:
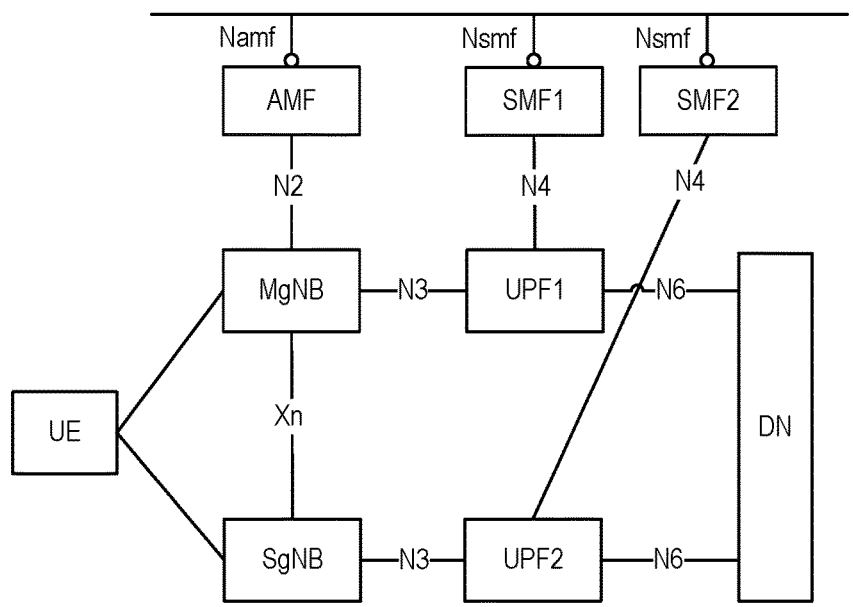
FIG. 2 illustrates a conventional reliability approach based on the Dual Connectivity (DC) feature of Fifth Generation (5G) or Fourth Generation (4G)
Figure 3:
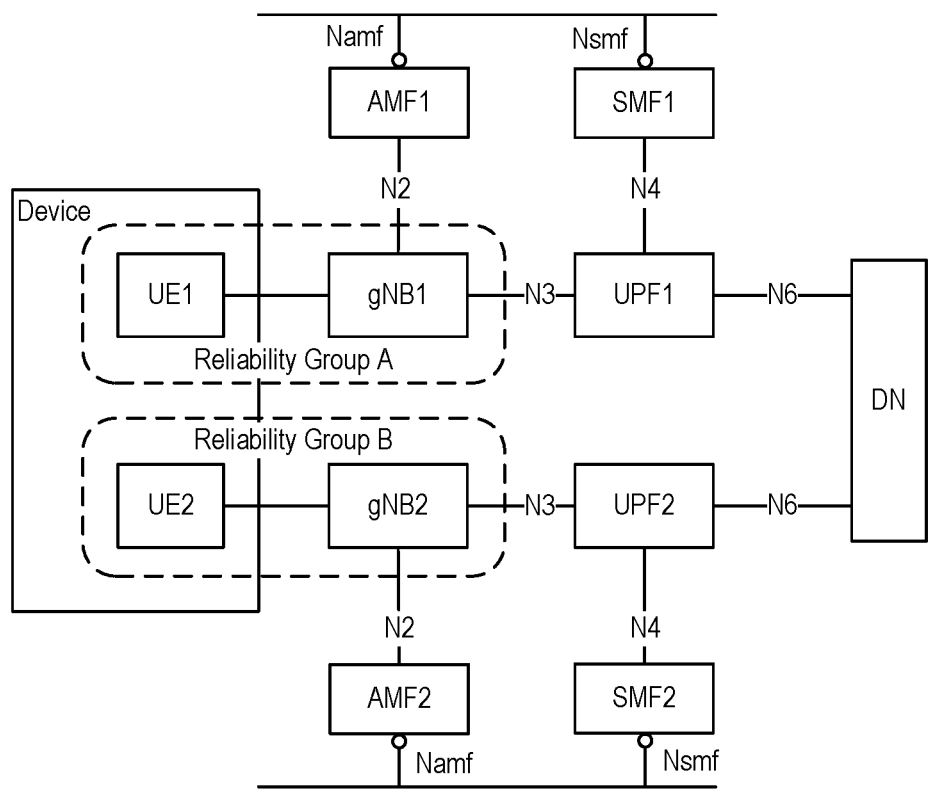
FIG. 3 illustrates another conventional reliability approach, which is to equip the terminal device with multiple physical User Equipments (UEs)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" or a "Radio Access Network (RAN) node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As discussed above, there currently exist certain challenge(s) related to User Plane (UP) path redundancy in a cellular communications system. The situation where the RAN cannot provide the requested UP resources is not sufficiently handled. In the conventional redundancy solution based on Dual Connectivity (DC) in 3GPP Technical Specification (TS) 23.501 V15.5.0 section 5.33.2.1, the RAN can indicate to the Core Network (CN) during the establishment of the Protocol Data Unit (PDU) session that redundancy in RAN cannot be provided as requested. However, this indication only takes place during the session establishment phase. The RAN status could change over time, and current standards do not describe how to handle events that occur after the session establishment phase.

A prior solution addresses that problem by adding a notification mechanism from the RAN to the CN, which can continuously update the CN about the RAN status. However, such a notification mechanism introduces a significant complexity in both the RAN and the CN, as well as a signaling load which adds to the signaling burden of the system.

Certain aspects of the present disclosure and their embodiments may provide solutions to the aforementioned or other challenges. As part of the redundancy solution, the CN requests the RAN to use a certain set of resources for UP traffic. The present disclosure proposes that the CN also sends an indication to the RAN about what the RAN should do when the requested set of resources for UP resources cannot be provided. Based on the indication, in the case that redundancy in the RAN cannot be provided, the RAN either releases the UP session (e.g., releases the corresponding PDU session) or keeps the UP session despite the fact that redundancy in the RAN cannot be provided. In other words, the CN indicates whether the specific UP resources that have been requested are required in which case the UP session is released if the specific UP resources cannot be provided, or whether the specific UP resources that have been requested are preferred in which case the UP session is kept even if the specific UP resources that have been requested cannot be provided.

The CN indicates to the RAN whether to keep or release the UP resources in case the CN requests to use a specific set of UP resources in the RAN. If the RAN cannot provide the UP resources requested by the CN, the RAN determines whether to keep or release the UP. In one embodiment, the RAN determines whether to keep or release the UP based on the indication received from the CN.

Certain embodiments may provide one or more of the following technical advantage(s). The indication helps determine the appropriate RAN action not only initially (e.g., at PDU session establishment), but later on as well. This is useful as the RAN redundancy status may change over time, e.g. DC status may change. The indication helps reduce system complexity, as a more complex notification mechanism to the CN can be avoided. The solution provides flexibility as well as robustness for the different network deployments.

Figure 4:
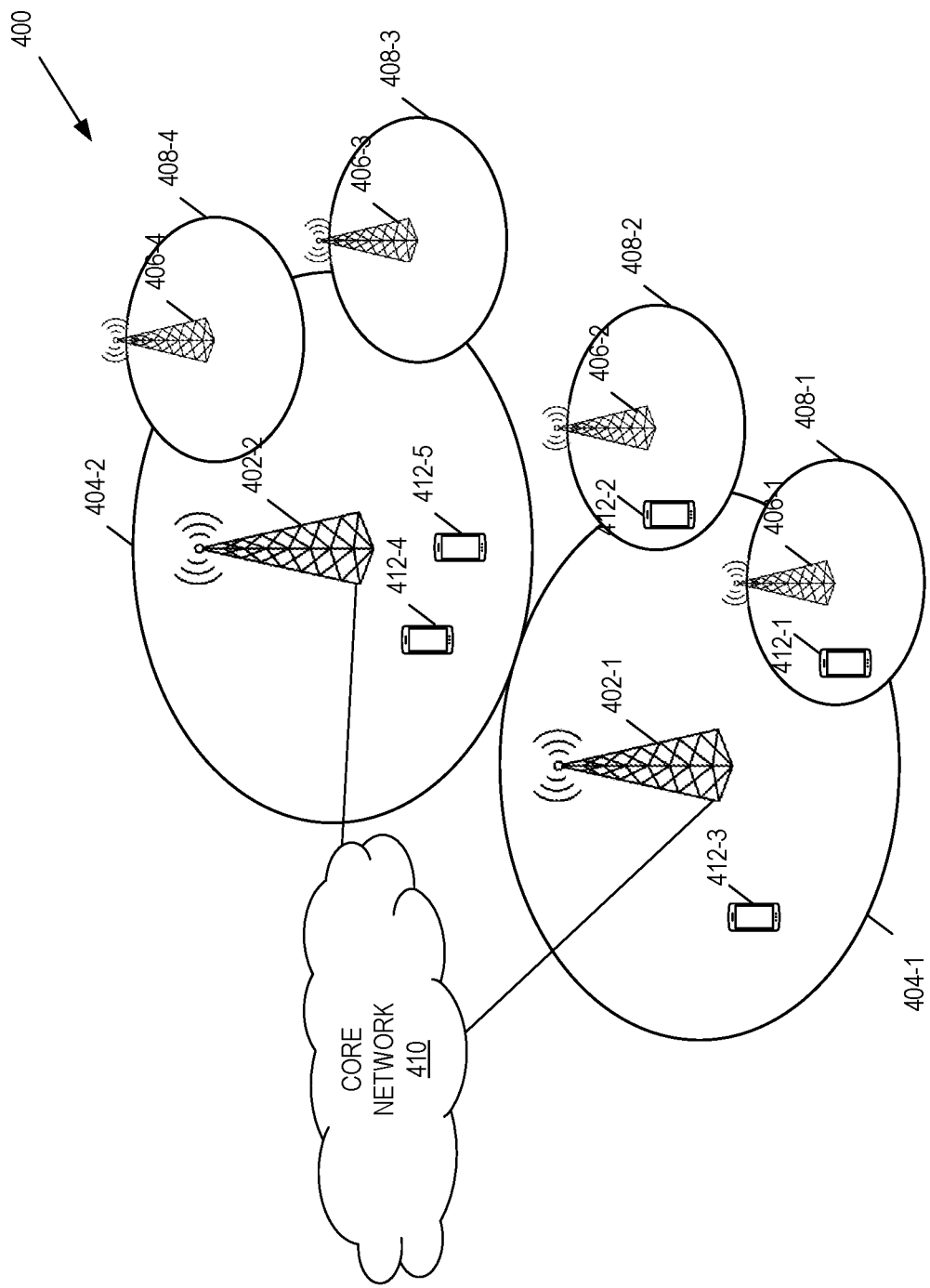
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G System (5GS) including a NR RAN, an Evolved Packet System (EPS) including a LTE RAN, or a combination of both. In this example, the RAN includes base stations 402-1 and 402-2, which in LTE are referred to as eNBs and in 5G NR are referred to as gNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G Core (5GC). The base stations 402 (and optionally the low power nodes 406) are connected to the core network 410.

The base stations 402 and the low power nodes 406 provide service to wireless devices 412-1 through 412-5 in the corresponding cells 404 and 408. The wireless devices 412-1 through 412-5 are generally referred to herein collectively as wireless devices 412 and individually as wireless device 412. The wireless devices 412 are also sometimes referred to herein as UEs.

Figure 5:
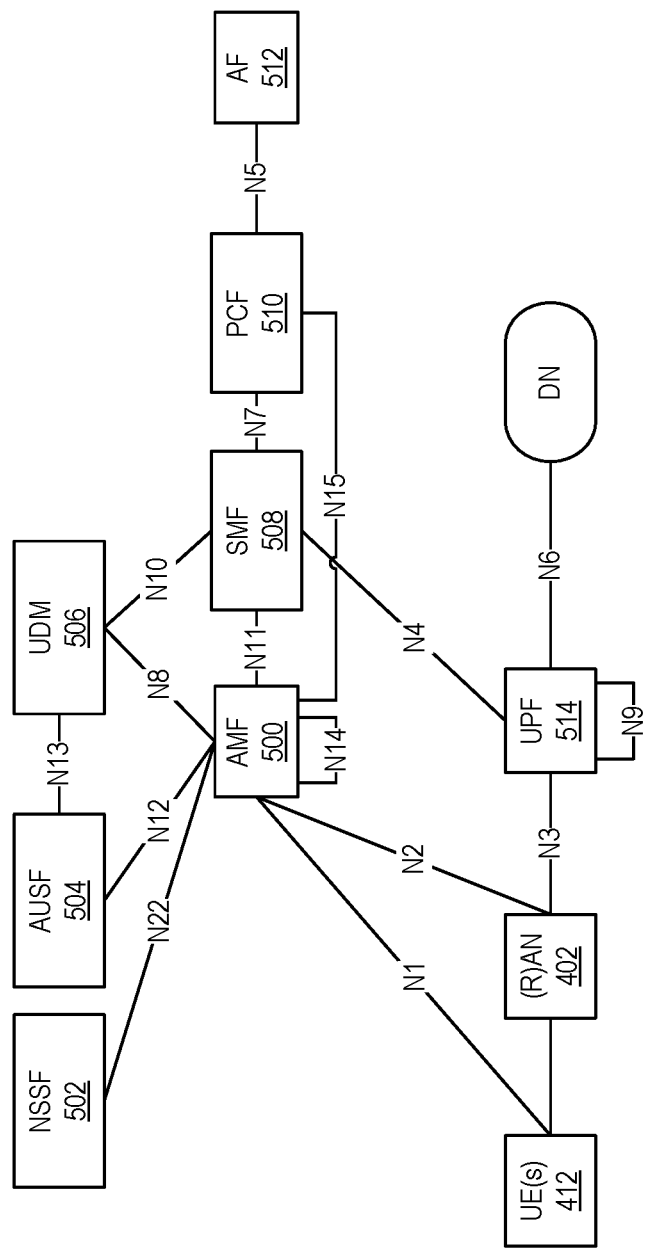
FIGS. 5 and 6 illustrate example embodiments of the cellular communications system in which the cellular communications system is a 5G System (5GS)

FIG. 5 illustrates a wireless communication system represented as a 5G network architecture composed of core NFs, where interaction between any two NFs is represented by a point-to-point reference point/interface. FIG. 5 can be viewed as one particular implementation of the system 400 of FIG. 4.

Seen from the access side the 5G network architecture shown in FIG. 5 comprises a plurality of UEs 412 connected to either a RAN 402 or an Access Network (AN) as well as an AMF 500. Typically, the R(AN) 402 comprises base stations, e.g. such as eNBs or gNBs or similar. Seen from the core network side, the 5GC NFs shown in FIG. 5 include a NSSF 502, an AUSF 504, a UDM 506, the AMF 500, a SMF 508, a PCF 510, and an Application Function (AF) 512.

Reference point representations of the 5G network architecture are used to develop detailed call flows in the normative standardization. The N1 reference point is defined to carry signaling between the UE 412 and AMF 500. The reference points for connecting between the AN 402 and AMF 500 and between the AN 402 and UPF 514 are defined as N2 and N3, respectively. There is a reference point, N11, between the AMF 500 and SMF 508, which implies that the SMF 508 is at least partly controlled by the AMF 500. N4 is used by the SMF 508 and UPF 514 so that the UPF 514 can be set using the control signal generated by the SMF 508, and the UPF 514 can report its state to the SMF 508. N9 is the reference point for the connection between different UPFs 514, and N14 is the reference point connecting between different AMFs 500, respectively. N15 and N7 are defined since the PCF 510 applies policy to the AMF 500 and SMF 508, respectively. N12 is required for the AMF 500 to perform authentication of the UE 412. N8 and N10 are defined because the subscription data of the UE 412 is required for the AMF 500 and SMF 508.

The 5GC network aims at separating UP and Control Plane (CP). The UP carries user traffic while the CP carries signaling in the network. In FIG. 5, the UPF 514 is in the UP and all other NFs, i.e., the AMF 500, SMF 508, PCF 510, AF 512, NSSF 502, AUSF 504, and UDM 506, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 500 and SMF 508 are independent functions in the CP. Separated AMF 500 and SMF 508 allow independent evolution and scaling. Other CP functions like the PCF 510 and AUSF 504 can be separated as shown in FIG. 5. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 6:
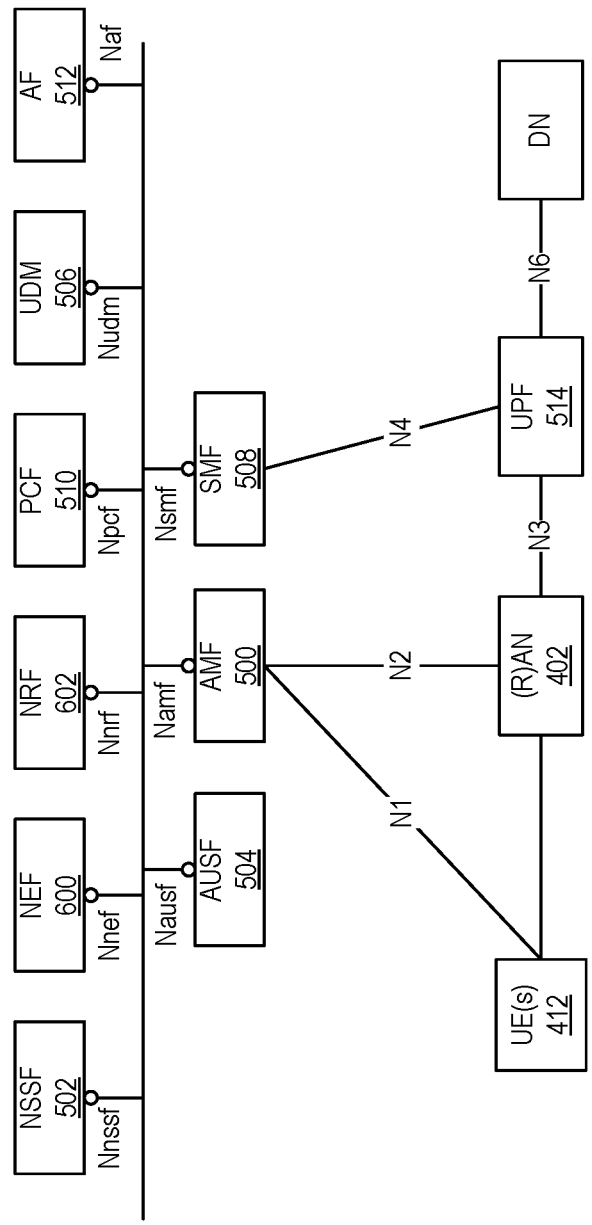

FIG. 6 illustrates a 5G network architecture using service-based interfaces between the NFs in the CP, instead of the point-to-point reference points/interfaces used in the 5G network architecture of FIG. 5. However, the NFs described above with reference to FIG. 5 correspond to the NFs shown in FIG. 6. The service(s) etc. that a NF provides to other authorized NFs can be exposed to the authorized NFs through the service-based interface. In FIG. 6 the service based interfaces are indicated by the letter "N" followed by the name of the NF, e.g. Namf for the service based interface of the AMF 500 and Nsmf for the service based interface of the SMF 508, etc. The NEF 600 and the NRF 602 in FIG. 6 are not shown in FIG. 5 discussed above. However, it should be clarified that all NFs depicted in FIG. 5 can interact with the NEF 600 and the NRF 602 of FIG. 6 as necessary, though not explicitly indicated in FIG. 5.

Some properties of the NFs shown in FIGS. 5 and 6 may be described in the following manner. The AMF 500 provides UE-based authentication, authorization, mobility management, etc. A UE 412 even using multiple access technologies is basically connected to a single AMF 500 because the AMF 500 is independent of the access technologies. The SMF 508 is responsible for session management and allocates Internet Protocol (IP) addresses to UEs. It also selects and controls the UPF 514 for data transfer. If a UE 412 has multiple sessions, different SMFs 508 may be allocated to each session to manage them individually and possibly provide different functionalities per session. The AF 512 provides information on the packet flow to the PCF 510 responsible for policy control in order to support QoS. Based on the information, the PCF 510 determines policies about mobility and session management to make the AMF 500 and SMF 508 operate properly. The AUSF 504 supports authentication function for UEs or similar and thus stores data for authentication of UEs or similar while the UDM 506 stores subscription data of the UE 412. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Basic Solution

When sending information from the AMF (e.g., AMF 500) to the gNB (e.g., gNB 402) about the requested user plane in RAN, the AMF also includes an indication whether to keep or release the UP in case the requested UP resources cannot be provided. The RAN takes this keep/release indication into account in case the requested UP cannot be provided. The indication is stored in the RAN context, where this storing can be done, e.g., on a per PDU session granularity. The stored indication can be transferred to the new RAN node in case of handover. Below, the basic solution is shown in general terms in action.

Figure 7:
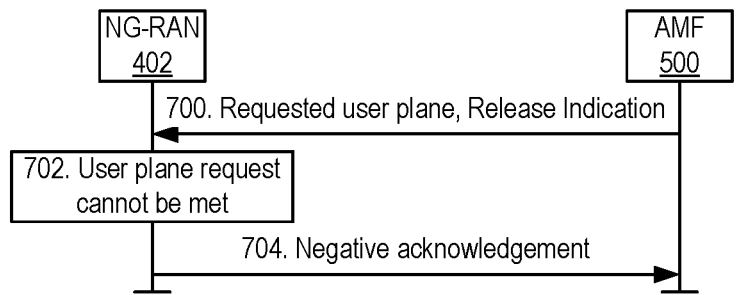
FIGS. 7 through 14 illustrate examples of a procedure for Radio Access Network (RAN) node action in accordance with embodiments of the present disclosure.

FIG. 7 illustrates CN indication of RAN action when redundancy is not available according to some embodiments of the present disclosure. In the embodiment illustrated in FIG. 7, the AMF (e.g., AMF 500) requests UP resources in the Next Generation RAN (NG-RAN) node (step 700), but the request cannot be met (step 702). The AMF request includes a release indication to the RAN. In other words, the release indication indicates that the specifically requested UP resources are required. Since the specifically requested UP resources are indicated as being required and the request cannot be met in the NG-RAN node, the NG-RAN node (e.g., base station 402) does not establish the UP resources and sends a negative acknowledgement back to the AMF (step 704).

Figure 8:
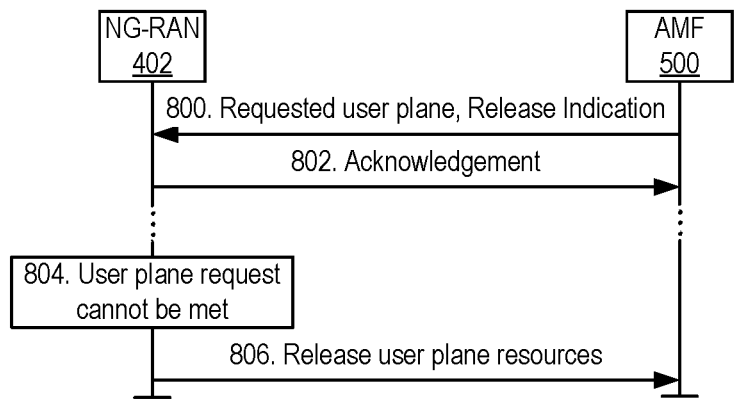

FIG. 8 illustrates CN indication of RAN action when redundancy is not available according to other embodiments of the present disclosure. This may be either because the requested UP resources could be met, or because the NG-RAN node cannot determine at this point whether or not it will be able to assign the requested UP resources. In the embodiment illustrated in FIG. 8, the AMF (e.g., AMF 500) also sends a release indication to the RAN (in other words, the specifically requested UP resources are required) (step 800), but the NG-RAN node (e.g., base station 402) initially establishes some UP resources, albeit not the specific UP resources requested by the AMF. Hence the NG-RAN node sends a positive acknowledgement to the AMF (step 802). It is possible that this acknowledgement includes further information, e.g. that the assignment of the requested UP resources is ongoing/pending or its success is unknown. When the NG-RAN node determines later on that the specifically requested UP resources cannot be met (step 804), it releases the UP resources that it had allocated and also sends an appropriate signaling message back to the AMF (step 806).

Figure 9:
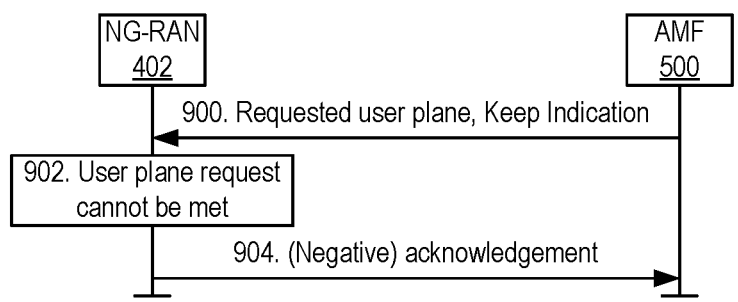

FIG. 9 illustrates CN indication of RAN action when redundancy is not available according to yet other embodiments of the present disclosure. In the embodiment illustrated in FIG. 9, the AMF (e.g., AMF 500) sends a keep indication to the NG-RAN node (e.g., base station 402) indicating to keep the UP even if the specifically requested resources cannot be met (in other words, the specifically requested UP resources are preferred) (step 900). In this case, the NG-RAN node can acknowledge the request even if the specifically requested resources cannot be met (steps 902 and 904). The acknowledgement may include information that the requested resources could not be provided. The notification may identify the actual UP in use, e.g. the NG-RAN node tells the AMF what UP resources were actually allocated (and that they are different from the specific resources that the AMF requested).

Figure 10:
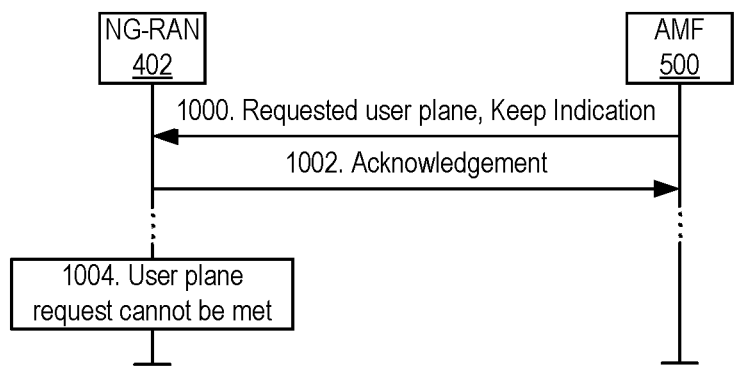

FIG. 10 illustrates CN indication of RAN action when redundancy is not available according to yet other embodiments of the present disclosure. In the embodiment illustrated in FIG. 10, the AMF (e.g., AMF 500) indicates to keep the UP session even if the specifically requested UP resources cannot be met (in other words, the specifically requested UP resources are preferred) (step 1000), and the NG-RAN node (e.g., base station 402) sends an acknowledgement in response (step 1002). This may either be because the requested UP resources could be provided, or because the NG-RAN node could not yet determine whether the requested UP resources are available or not. Later on it turns out that the specifically requested UP resources cannot be provided (step 1004), yet the UP session is maintained and no signaling is sent to the AMF. Alternatively, notification messages may be sent to the AMF, but the UP session is maintained. The notification may identify the actual UP resources in use.

Embodiments for DC Based Redundancy

Below, embodiments of the solution are shown for the scenario of DC based redundancy as defined in 3GPP TS 23.501 section 5.33.2.1. In this case the AMF's message is triggered from the SMF (e.g., SMF 508), which may provide the Redundancy Sequence Number (RSN) parameter as well as the keep or release indication.

Figure 11:
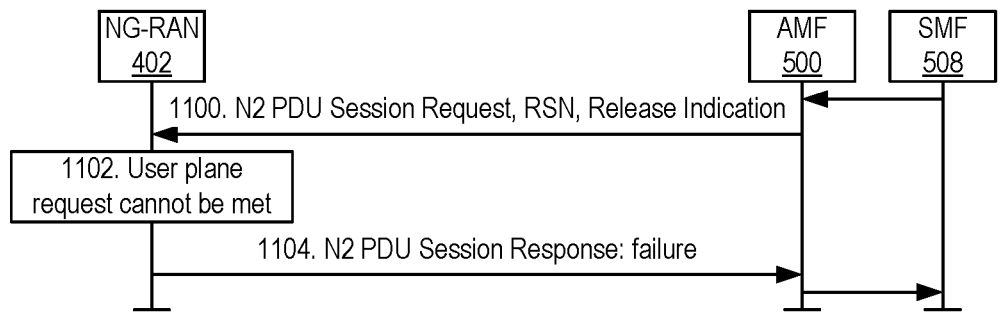

FIG. 11 illustrates CN indication of RAN action when redundancy is not available according to yet other embodiments of the present disclosure. In the embodiment illustrated in FIG. 11, the AMF (e.g., AMF 500) indicates release to the NG-RAN node (e.g., base station 402) (step 1100). As illustrated, in step 1100, the AMF sends, to the NG-RAN node, an N2 PDU session request, RSN, and the release indication. In this example, the NG-RAN node cannot provide the UP resources indicated by the given RSN parameter (e.g., the NG-RAN node cannot provide disjoint UP resources for each separate RSN value, as needed) (step 1102). In other words, the NG-RAN node determines that the NG-RAN node cannot provide the UP resources indicated by the given RSN parameter. Thanks to the release indication, the NG-RAN node knows that it should not establish the PDU session in this case, and reports failure to the AMF (and further to the SMF (e.g., SMF 508)) in an N2 PDU session response (step 1104). The message may include further information about the cause of the failure.

Figure 12:
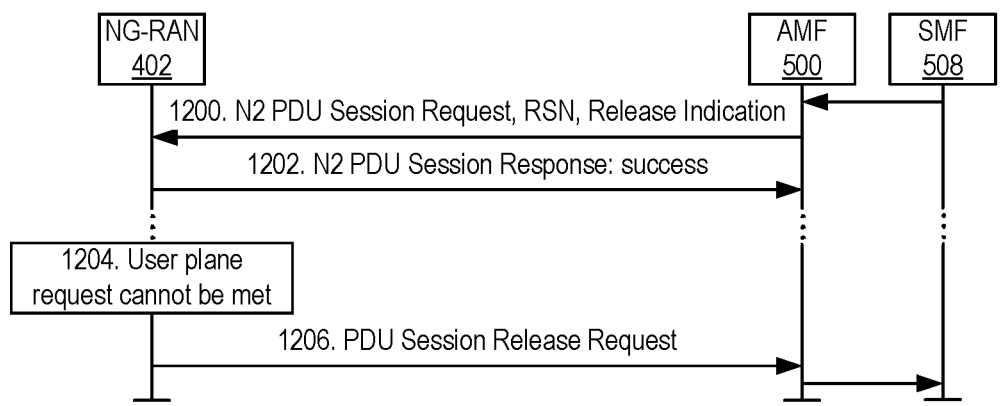

FIG. 12 illustrates CN indication of RAN action when redundancy is not available according to yet other embodiments of the present disclosure. In the embodiment illustrated in FIG. 12, the AMF (e.g., AMF 500) also sends a release indication to the NG-RAN node (e.g., base station 402) along with the N2 PDU session request and RSN (step 1200), but the NG-RAN node establishes the PDU session initially and, as illustrated, sends an N2 session response indicating a success to the AMF (and further to the SMF (e.g., SMF 508)) (step 1202). This may be either because the UP resources indicated by the RSN parameter could be provided, or because the NG-RAN node cannot initially determine whether the requested UP resources can be provided, and so established the PDU session using UP resources other than the specific resources originally requested.

Later on, when the NG-RAN (e.g., the NG-RAN node) determines that the specifically requested UP resources indeed cannot be provided (step 1204), the NG-RAN node initiates the release of the PDU session (step 1206). Note that subsequent signaling for the release is not shown.

Figure 13:
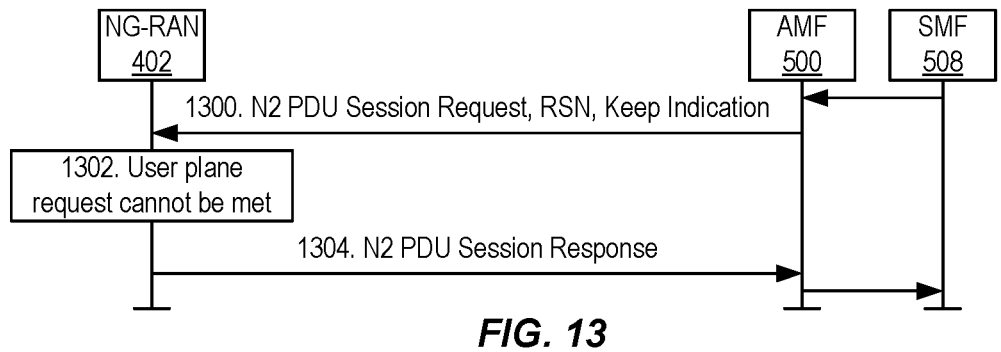

FIG. 13 illustrates CN indication of RAN action when redundancy is not available according to yet other embodiments of the present disclosure. In the embodiment illustrated in FIG. 13, the AMF (e.g., AMF 500) includes the keep indication (which may originate from the SMF 508) with N2 PDU session request and RSN (step 1300). Even though the NG-RAN node cannot meet the UP resources requested by the RSN parameter (step 1302), the PDU session is nevertheless established using UP resources different from the UP resources specifically requested. In other words, the NG-RAN node (e.g., base station 402) determines that the NG-RAN cannot meet the UP resources requested by the RSN parameter in step 1302. The NG-RAN node sends an N2 PDU session response to the AMF (and further to the SMF) (step 1304). The N2 PDU session response might include information about this, but that is not necessary.

Figure 14:
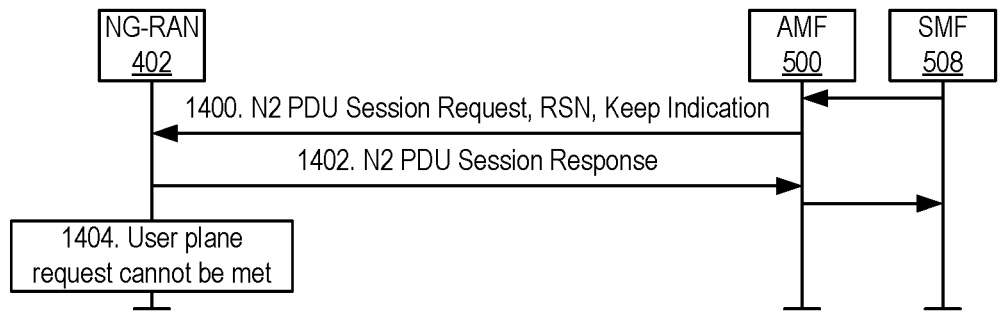

FIG. 14 illustrates CN indication of RAN action when redundancy is not available according to yet other embodiments of the present disclosure. In the embodiment illustrated in FIG. 14, the AMF (e.g., AMF 500) sends an N2 PDU session request together with an RSN and a keep indication to the NG-RAN node (e.g., base station 402) (step 1400). The NG-RAN node could originally provide the requested UP resources, or it can initially not determine whether or not the requested resources can be provided. The PDU session is nevertheless established due to the keep indication and, as such, an N2 PDU session response that indicates a success is sent to the AMF (and further to the SMF) (step 1402). The PDU session remains established later on even when the NG-RAN node determines that the specifically requested UP resources are not available (step 1404).

Example description of RAN handling for DC based redundancy: The following is an exemplary description of the RAN specification for the keep or release indication. Referring to 3GPP TS 23.501, The PDU session resource redundant information element (referred to as PDU Session Redundancy Information Element (IE) in the table below) associates the requested PDU session resource to a group of NG-RAN UP resources which shall be allocated in a redundant way as compared to PDU session resources associated with a different RSN value.

A new redundancy Indication type IE is added. The redundancy indication type with value "required" indicates that the NG-RAN node shall use the UP group indicated by the RSN. If the NG-RAN node cannot allocate the UP group indicated by the RSN, it shall reject the setup of the PDU session resources with an appropriate cause value. If the NG-RAN node cannot maintain the already allocated UP group as indicated by the RSN, it shall request the release of the PDU session resources with an appropriate cause value.

The redundancy indication type with value "preferred" indicates that the NG-RAN node should use the indicated UP group indicated by the RSN. Even if the NG-RAN node cannot allocate the UP group indicated by the RSN, the PDU session can still be established and maintained. The NG-RAN node notifies the CN whether the UP group indicated by the RSN is used or not.

NOTE: How redundant PDU session resources are allocated at the NG-RAN is a matter of implementation and configuration.

The table below shows an exemplary description of some parameters for a message from the AMF to the NG-RAN node for setting up PDU sessions. The last three rows show the new additions for redundancy information. The last row describes the redundancy indication type, which is the proposal herein.

| IE/Group Name | Presence | Range | IE type and reference | Semantics description |
|---|---|---|---|---|
| PDU Session Resource Setup Request List | | 1 | | |
| >PDU Session Resource Setup Request Item IEs | | 1 ... <max no of PDU Sessions> | | |
| >>PDU Session ID | M | | | |
| >>NAS-PDU | O | | | |
| >>S-NSSAI | M | | | |

-continued

| IE/Group Name | Presence | Range | IE type and reference | Semantics description |
|---|---|---|---|---|
| >>PDU Session Resource Setup Request Transfer | M | | | |
| >>PDU Session Redundancy Info | O | | | |
| >>>Redundancy Sequence Number (RSN) | M | | ENUMERATED (1, 2, . . . ) | Indicates redundant user plane requirements for the PDU Sessions. |
| >>>Redundancy Indication Type | M | | ENUMERATED (required, preferred) | Indicates whether RAN the user plane resources indicated by RSN are required or preferred. |

Embodiment for Redundancy Solution Based on Multiple UEs

The subject matter presented herein may also be applied for the redundancy solution as described in TS 23.501 Annex F. In that case, the CN's request may correspond to establishing the UE context in the RAN for a given redundancy group. The redundancy group may be indicated, e.g., using the Radio Access Technology (RAT) and Frequency Selection Priority (RFSP) parameter. Based on the keep (preferred) or release (required) indication, the NG-RAN node may decide to keep or release the UE context when the CN's request for the redundancy group cannot be met. It may be possible to limit the solution to keeping/releasing only a certain set of PDU sessions, not the full UE context.

Variations of the Indication

It is possible to introduce various options for the indication about whether to keep or release the UP resources when the CN's request cannot be met.
  It could be indicated whether to keep or release the resources when the request cannot be met for a given period of time. It may be possible to indicate the time period, or it may be possible to pre-configure the time periods in the RAN. There may be multiple indications for multiple time periods, e.g. keep the UP for a short period of time if the resources cannot be met, but release the UP session after a longer period of time if the resources cannot be met. This requires that the RAN node measures the time while the request cannot be met. (This measurement may be taken with a coarse time granularity as well.)
  It could be indicated from the CN to the RAN that the CN expects to establish the requested UP resources immediately, e.g. during the establishment of the UP session. This could prevent the establishment of the UP session in case the NG-RAN node cannot determine immediately whether the request is satisfied, and the release indication is sent.
  The examples above show a single UP session and the determination is done for the UP session on its own whether the request could be met or not. But it may be possible to check for other criteria, e.g. whether two UP sessions can be established so that the paths remain disjoint. The condition could be checked for both sessions separately. It could be possible that one session has a keep and the other session has a release indication.

It may be possible that the RAN has predefined time scheduling when the conditions are checked. E.g., the condition may be checked periodically. It is possible that the condition is checked at different times for different UEs.

Example Implementation

One example implementation of some embodiments of the present disclosure is provided below in the form of changes to 3GPP TS 23.501 V15.5.0:

Additional Aspects

Figure 15:
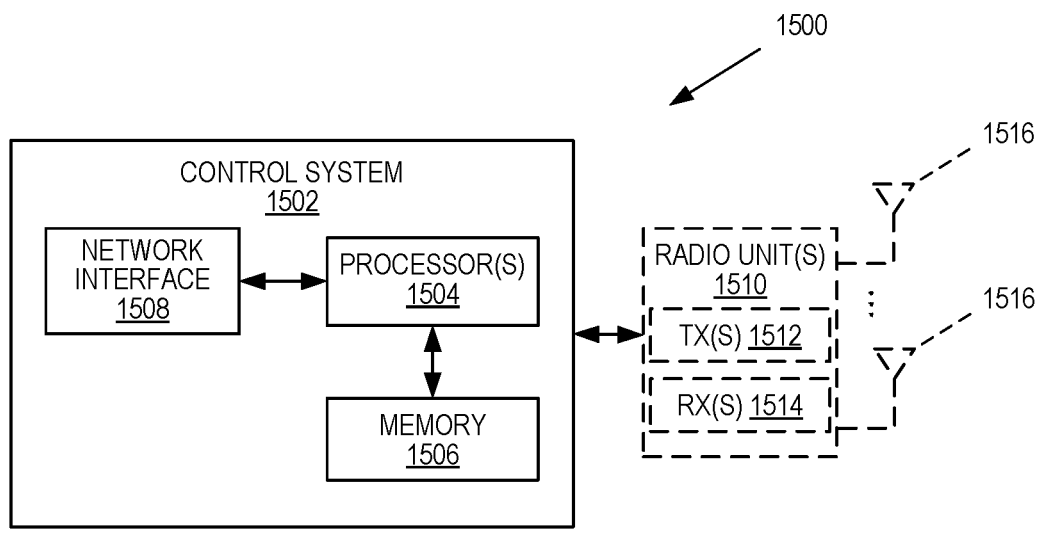
FIGS. 15 through 17 are schematic block diagrams of a network node in accordance with embodiments of the present disclosure.

FIG. 15 is a schematic block diagram of a network node 1500 according to some embodiments of the present disclosure. The network node 1500 may be, for example, a radio access node, such as a base station 402 or 406, or a core network node. As illustrated, the network node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the network node 1500 optionally includes one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a network node 1500 as described herein. In some embodiments, the function(s) are implemented in software that is stored, e.g., in the memory 1506 and executed by the one or more processors 1504.

Figure 16:
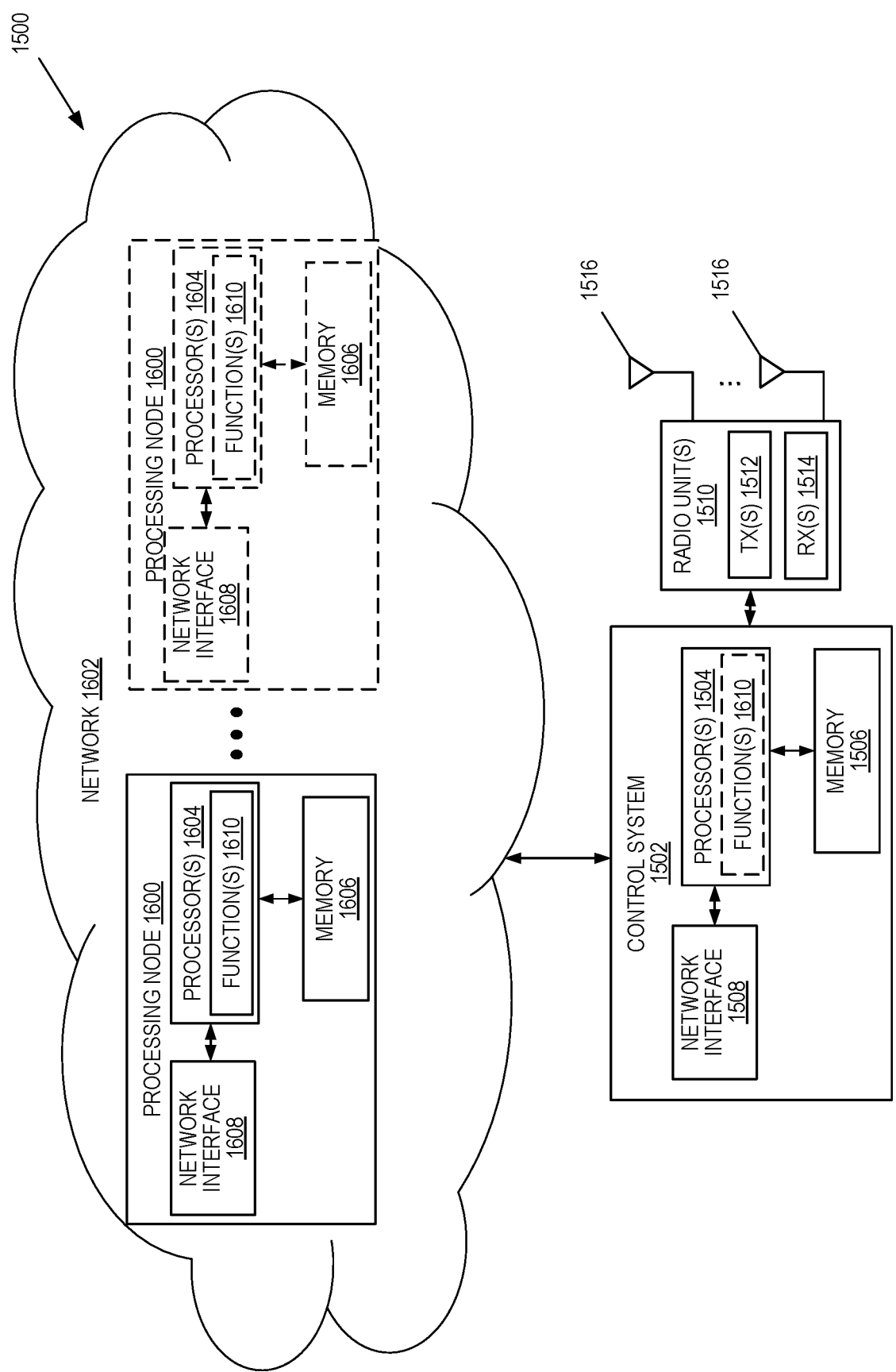
Figure 18:
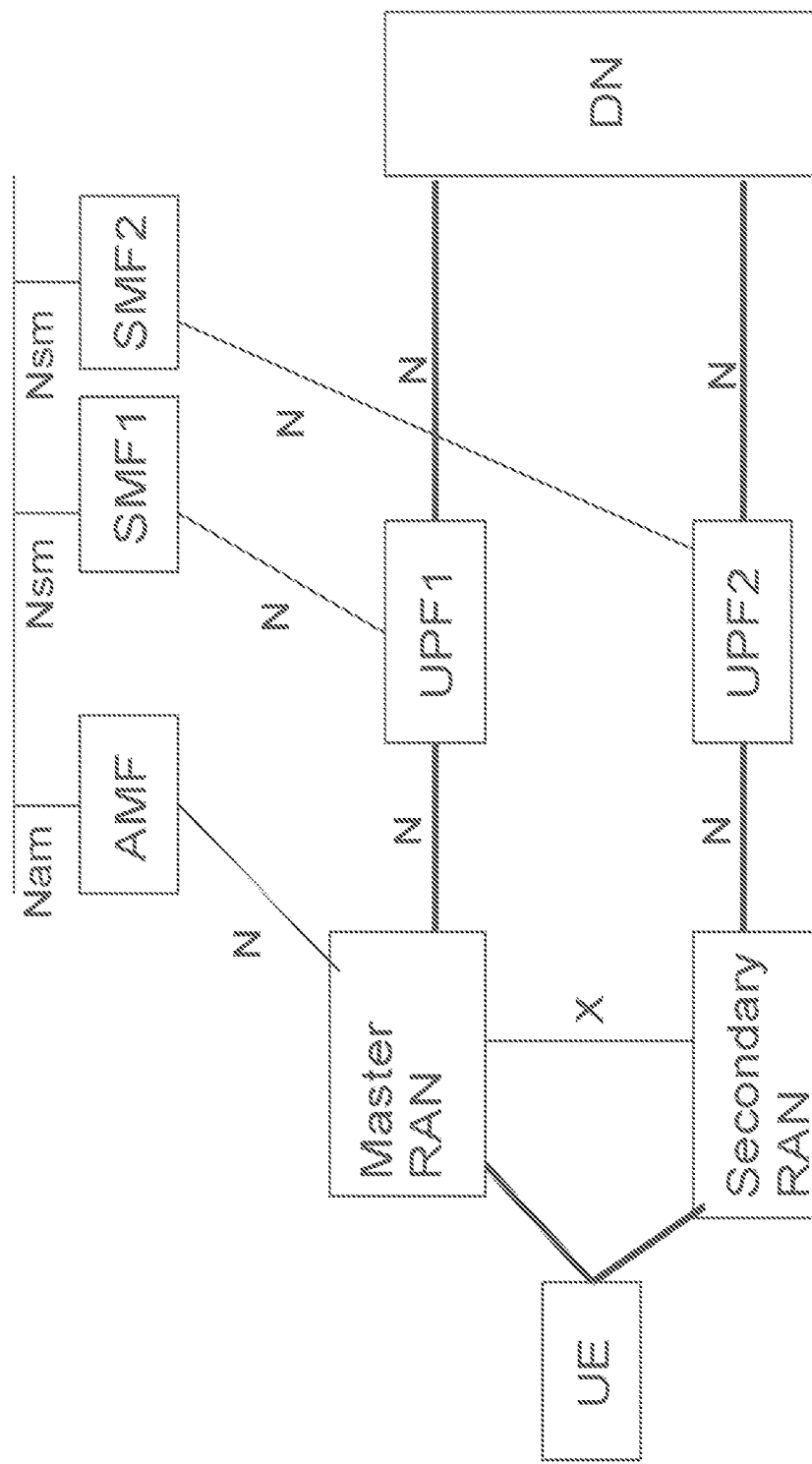
FIG. 18 is a recreation of FIG. 5.33.2.1-1 of Third Generation Partnership Project (3GPP) Technical Specification (TS) 23.501 V15.5.0.

FIG. 16 is a schematic block diagram that illustrates a virtualized embodiment of the network node 1500 according to some embodiments of the present disclosure. This discussion is equally applicable to other types of network nodes. Further, other types of network nodes may have similar virtualized architectures.

As used herein, a "virtualized" radio access node is an implementation of the network node 1500 in which at least a portion of the functionality of the network node 1500 is implemented as a virtual component(s) (e.g., via a virtual machine(s) executing on a physical processing node(s) in a network(s)). As illustrated, in this example, the network node 1500 includes the control system 1502 that includes the one or more processors 1504 (e.g., CPUs, ASICs, FPGAs, and/or the like), the memory 1506, and the network interface 1508 and the one or more radio units 1510 that each includes the one or more transmitters 1512 and the one or more receivers 1514 coupled to the one or more antennas 1516, as described above. The control system 1502 is connected to the radio unit(s) 1510 via, for example, an optical cable or the like. The control system 1502 is connected to one or more processing nodes 1600 coupled to or included as part of a network(s) 1602 via the network interface 1508. Each processing node 1600 includes one or more processors 1604 (e.g., CPUs, ASICs, FPGAs, and/or the like), memory 1606, and a network interface 1608.

In this example, functions 1610 of the network node 1500 described herein are implemented at the one or more processing nodes 1600 or distributed across the control system 1502 and the one or more processing nodes 1600 in any desired manner. In some particular embodiments, some or all of the functions 1610 of the network node 1500 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 1510 communicate directly with the processing node(s) 1600 via an appropriate network interface(s).

In some embodiments, a computer program including instructions which, when executed by at least one processor, causes the at least one processor to carry out the functionality of network node 1500 or a node (e.g., a processing node 1600) implementing one or more of the functions 1610 of the network node 1500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
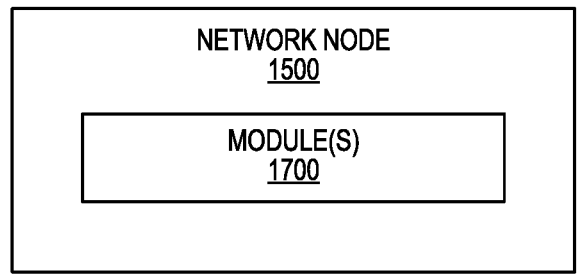

FIG. 17 is a schematic block diagram of the network node 1500 according to some other embodiments of the present disclosure. The network node 1500 includes one or more modules 1700, each of which is implemented in software. The module(s) 1700 provide the functionality of the network node 1500 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method, performed by a network node in telecommunications core network, for indication of a Radio Access Network, RAN, action when redundancy is not available, the method comprising: sending, to a RAN, a request for a set of User Plane, UP, resources in the RAN, the request comprising an indication that the requested set of UP resources is required or preferred; and receiving, from the RAN, a response to the request for UP resources.

Embodiment 2: The method of embodiment 1, wherein the telecommunications core network comprises a Fifth Generation, 5G, core network or a Long Term Evolution, LTE, core network.

Embodiment 3: The method of embodiment 1 or 2, wherein the network node comprises an Access and Mobility Management Function, AMF.

Embodiment 4: The method of any of embodiments 1-3 wherein receiving the response to the request for the set of UP resources comprises receiving an acknowledgement indicating that the requested set of UP resources were provided or receiving a negative acknowledgement indicating that the requested set of UP resources were not provided.

Embodiment 5: The method of any of embodiments 1-3 wherein the request identifies a Protocol Data Unit, PDU, session and wherein the indication that the requested set of UP resources is required or preferred applies to the identified PDU session.

Embodiment 6: The method of embodiment 5 wherein an indication that the requested set of UP resources is required indicates that: the PDU session should not be created if the requested set of UP resources is not available; and the PDU session should be created if the requested set of UP resources is available but released if the UP resources subsequently become unavailable.

Embodiment 7: The method of embodiment 5 wherein an indication that the UP resources are preferred indicates that: the PDU session should be created even if the requested set of UP resources is not available; and the PDU session should use the requested set of UP resources if the requested set of UP resources subsequently become unavailable.

Embodiment 8: The method of any of embodiments 5-7 wherein receiving the response to the request for UP resources comprises receiving an indication that the PDU session was created or an indication that the PDU session was not created.

Embodiment 9: The method of any of embodiments 1-8 wherein the request further comprises a Redundancy Sequence Number, RSN, parameter to indicate that redundant UP resources shall be provided for the PDU session by means of dual connectivity.

Embodiment 10: The method of any of embodiments 1-9, the request further comprising an indication whether to keep or release the allocated UP resources when the request cannot be met for a given period of time.

Embodiment 11: The method of embodiment 10 wherein the given period of time to keep the allocated UP resources when the request cannot be met is different from the given period of time to release the allocated UP resources when the request cannot be met.

Embodiment 12: The method of any of embodiments 1-11, the request further comprising an indication to establish the requested UP resources only if they can be established within a given period of time.

Embodiment 13: The method of any of embodiments 1-12, the request further comprising an indication that the decision to keep or release an UP session depends upon the presence, absence, or status of another, different UP session.

Embodiment 14: The method of any of embodiments 1-13, the request further identifying a period or interval during or at which the RAN should check the availability or unavailability of the requested set of UP resources.

Group B Embodiments—RAN

Embodiment 15: A method, performed by a Radio Access Network, RAN, for indication of a RAN action when redundancy is not available, the method comprising: receiving, from a telecommunications core network node, a request for a set of User Plane, UP, resources in the RAN, the request comprising an indication that the requested set of UP resources is required or preferred; determining an availability of the requested set of UP resources; performing an action based on the availability of the requested set of UP resources and the indication that the requested set of UP resources is required or preferred; and sending, to the core network node, a response to the request for the set of UP resources, the response based on the availability of the requested set of UP resources and the indication that the requested set of UP resources is required or preferred.

Embodiment 16: The method of embodiment 15 wherein performing an action based on the availability of the requested set of UP resources and the indication that the requested set of UP resources is required or preferred comprises one of: upon determining that the requested set of UP resources is available, indicating, in the response to the request for the set of UP resources, that the requested set of UP resources have been allocated; upon determining that the requested set of UP resources is required but unavailable, indicating, in the response to the request for the set of UP resources, a failure to allocate the requested set of UP resources; or upon determining that the requested set of UP resources is preferred but unavailable, indicating, in the response to the request for the set of UP resources, an acknowledgement to allocate the set of UP resources if they subsequently become available.

Embodiment 17: The method of embodiment 15 or 16, further comprising detecting a change of redundancy status and performing a second action based on the availability of the requested set of UP resources and the indication that the requested set of UP resources is required or preferred.

Embodiment 18: The method of embodiment 17 wherein performing the second action based on the availability of the requested set of UP resources and the indication that the requested set of UP resources is required or preferred comprises one of: upon determining that the requested set of preferred UP resources is now available, creating a PDU session associated with the preferred UP resources; and upon determining that the requested set of required UP resources is no longer available, releasing a PDU session associated with the required UP resources.

Embodiment 19: The method of any of embodiments 15-18, wherein the RAN comprises a Fifth Generation, 5G, RAN or a Long Term Evolution, LTE, RAN.

Embodiment 20: The method of any of embodiments 15-19 wherein the request for UP resources comprises a Redundancy Sequence Number, RSN, parameter to indicate that redundant UP resources shall be provided for the PDU session by means of dual connectivity.

Embodiment 21: The method of any of embodiments 15-20, the request further comprising an indication whether to keep or release the allocated UP resources when the request cannot be met for a given period of time and wherein performing the action comprises performing the action according to this additional indication.

Embodiment 22: The method of embodiment 21 wherein the given period of time to keep the allocated UP resources when the request cannot be met is different from the given period of time to release the allocated UP resources when the request cannot be met and wherein performing the action comprises performing the action according to this additional indication.

Embodiment 23: The method of any of embodiments 15-22, the request further comprising an indication to establish the requested set of UP resources only if they can be established within a given period of time and wherein performing the action comprises performing the action according to this additional indication.

Embodiment 24: The method of any of embodiments 15-23, the request further comprising an indication that the decision to keep or release a UP session depends upon the presence, absence, or status of another, different UP session and wherein performing the action comprises performing the action according to this additional indication.

Embodiment 25: The method of any of embodiments 15-24, the request further identifying a period or interval during or at which the RAN should check the availability or unavailability of the requested set of UP resources.

Group C Embodiments

Embodiment 26: A network node in telecommunications core network, the network node comprising: processing circuitry configured to perform any of the steps of any of the Group A embodiments; and power supply circuitry configured to supply power to the wireless device.

Embodiment 27: The network node of embodiment 26, wherein the telecommunications core network comprises a Fifth Generation, 5G, network or a Long Term Evolution, LTE, network.

Embodiment 28: The network node of embodiment 26 or 27, wherein the network node comprises an Access and Mobility Management Function, AMF.

Embodiment 29: A Radio Access Network, RAN, the RAN comprising:
processing circuitry configured to perform any of the steps of any of the Group B embodiments; and power supply circuitry configured to supply power to the base station.

Embodiment 30: The RAN of embodiment 29, wherein the RAN comprises a Fifth Generation, 5G, RAN or a Long Term Evolution, LTE, RAN.

At least some of the following abbreviations may be used in this disclosure. If there is an inconsistency between abbreviations, preference should be given to how it is used above. If listed multiple times below, the first listing should be preferred over any subsequent listing(s).

3G Third Generation
3GPP Third Generation Partnership Project
4G Fourth Generation
5G Fifth Generation
5GC Fifth Generation Core
5GS Fifth Generation System
AF Application Function
AGV Automated Guided Vehicle
AMF Access and Mobility Management Function
AN Access Network
ASIC Application Specific Integrated Circuit
AUSF Authentication Server Function
C-MTC Critical Machine Type Communication
CN Core Network
CP Control Plane
CPU Central Processing Unit
DC Dual Connectivity
DetNet Deterministic Networking
DN Data Network
DSP Digital Signal Processor
eMBB Enhanced Mobile Broadband
eNB Enhanced or Evolved Node B
EPS Evolved Packet System
FPGA Field Programmable Gate Array
FRER Frame Replication and Elimination for Reliability
gNB New Radio Base Station
HSS Home Subscriber Server
IE Information Element
IEEE Institute of Electrical and Electronic Engineers
IETF Internet Engineering Task Force
IP Internet Protocol
ITS Intelligent Traffic Systems
LTE Long Term Evolution
MgNB Master New Radio Base Station
MME Mobility Management Entity
M-MTC Massive Machine Type Communication
MTC Machine Type Communication
NEF Network Exposure Function
NF Network Function
NG-RAN Next Generation Radio Access Network
NR New Radio
NRF Network Function Repository Function
NSSF Network Slice Selection Function
PCF Policy Control Function
PDU Protocol Data Unit
P-GW Packet Data Network Gateway
PREF Packet Replication and Elimination Function
RAM Random Access Memory
RAN Radio Access Network
RAT Radio Access Technology
RFSP Radio Access Technology and Frequency Selection Priority
ROM Read Only Memory
RRH Remote Radio Head
RSN Redundancy Sequence Number
RU Round Trip Time
SCEF Service Capability Exposure Function
SgNB Secondary New Radio Base Station
SMF Session Management Function
TS Technical Specification
TSN Time Sensitive Networking
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

What is claimed is:

1. A method performed by a Radio Access Network, RAN, node for RAN action when redundancy is not available, the method comprising:
    receiving, from a core network node, a request for a set of User Plane, UP, resources in a RAN;
    determining whether the request for the set of UP resources in the RAN can be met; and
    sending, to the core network node, a response to the request for the set of UP resources that is based on whether the request for the set of UP resources in the RAN can be met.

2. The method of claim 1 wherein the request comprises an indication that the requested set of UP resources is required or preferred, and the response to the request for the set of UP resources is further based on the indication that the requested set of UP resources is required or preferred.

3. The method of claim 2 further comprising establishing or refraining from establishing the requested set of UP resources based on whether the request for the set of UP resources in the RAN can be met and the indication that the requested set of UP resources is required or preferred.

4. The method of claim 2 wherein:
    the indication is an indication that the requested set of UP resources is required;
    determining whether the request for the set of UP resources in the RAN can be met comprises determining that the request for the set of UP resources in the RAN cannot be met; and
    the response provides a negative acknowledgement.

5. The method of claim 2 wherein:
    the indication is an indication that the requested set of UP resources is required;
    determining whether the request for the set of UP resources in the RAN can be met comprises determining that the request for the set of UP resources in the RAN can be met; and
    the response comprises a positive acknowledgement.

6. The method of claim 2, wherein:
    the indication is an indication that the requested set of UP resources is preferred;
    determining whether the request for the set of UP resources in the RAN can be met comprises determining that the request for the set of UP resources in the RAN cannot be met; and
    the response comprises information that indicates that the requested set of UP resources could not be provided.

7. The method of claim 2, wherein:
    the indication is an indication that the requested set of UP resources is preferred;
    determining whether the request for the set of UP resources in the RAN can be met comprises determining that the RAN node is unable to determine whether the request for the set of UP resources in the RAN can be met; and
    the response provides a positive acknowledgement.

8. The method of claim 1, wherein the request further comprises an indication of whether to keep or release allocated UP resources when the request cannot be met for a given period of time.

9. The method of claim 8 wherein the given period of time to keep the allocated UP resources when the request cannot be met is different from the given period of time to release the allocated UP resources when the request cannot be met.

10. The method of claim 1, wherein the request further comprises an indication to establish the requested set of UP resources only if the requested set of UP resources can be established within a given period of time.

11. The method of claim 1, wherein the request further comprises an indication that the decision to keep or release an UP session depends upon the presence, absence, or status of another, different UP session.

12. The method of claim 1, wherein the request further identifies a period or interval during or at which the RAN should check availability or unavailability of the requested set of UP resources.

13. A method performed by a network node in a core network of a cellular communications system for indication of a Radio Access Network, RAN, action when redundancy is not available, the method comprising:
sending, to a RAN node, a request for a set of User Plane, UP, resources in the RAN, the request comprising an indication that the requested set of UP resources is required or preferred; and
receiving, from the RAN node, a response to the request for the set of UP resources that is based on whether the request for the set of UP resources in the RAN can be met.

14. The method of claim 13 wherein:
the request identifies a Protocol Data Unit, PDU, session;
the set of UP resources is a set of UP resources for the PDU session; and
the indication that the requested set of UP resources is required or preferred is provided for the PDU session on a per-PDU-session granularity.

15. The method of claim 14, wherein the request further comprises a Redundancy Sequence Number, RSN, that indicates whether the PDU session is one of two or more redundant PDU sessions.

16. The method of claim 14, wherein the indication is an indication that the requested set of UP resources is required.

17. The method of claim 16, wherein the indication that the requested set of UP resources is required indicates that the PDU session should be created if the requested set of UP resources is available but released if the set of UP resources subsequently becomes unavailable.

18. The method of claim 14, wherein the indication is an indication that the set of UP resources is preferred.

19. The method of claim 18, wherein the indication that the set of UP resources is preferred indicates that the PDU session should be created even if the requested set of UP resources is not available.

20. The method of claim 18, wherein the indication that the set of UP resources is preferred indicates that the PDU session should use the requested set of UP resources if the requested set of UP resources subsequently becomes unavailable.

* * * * *